United States Patent [19]

Asanuma et al.

[11] Patent Number: 4,581,426

[45] Date of Patent: Apr. 8, 1986

[54] PROCESS FOR POLYMERIZATION OF α-OLEFINS AND CATALYSTS THEREFOR

[75] Inventors: Tadashi Asanuma; Tetsunosuke Shiomura, both of Osaka, Japan

[73] Assignee: Mitsui Toatsu Chemicals, Inc., Japan

[21] Appl. No.: 722,536

[22] Filed: Apr. 12, 1985

Related U.S. Application Data

[63] Continuation of Ser. No. 337,553, Jan. 6, 1982, abandoned, which is a continuation of Ser. No. 116,726, Jan. 30, 1980, abandoned.

[30] Foreign Application Priority Data

Jan. 30, 1979 [JP] Japan .................................. 54-8762

[51] Int. Cl.$^4$ ...................... C08F 4/02; C08F 10/00
[52] U.S. Cl. ................................ 526/125; 502/105; 502/125; 526/128; 526/351; 526/906
[58] Field of Search ........................ 502/125; 526/125

[56] References Cited

U.S. PATENT DOCUMENTS

| | | | |
|---|---|---|---|
| 4,107,412 | 8/1978 | Welch ................................ | 526/125 |
| 4,107,413 | 8/1978 | Giannini et al. ...................... | 526/125 |
| 4,107,414 | 8/1978 | Giannini et al. ...................... | 526/125 |
| 4,107,415 | 8/1978 | Giannini et al. ...................... | 526/125 |
| 4,168,361 | 9/1979 | Oda et al. ............................. | 526/125 |
| 4,180,636 | 12/1979 | Hirota et al. ......................... | 526/125 |
| 4,243,552 | 1/1981 | Welch et al. ......................... | 526/125 |
| 4,246,136 | 1/1981 | Ueno et al. ........................... | 526/125 |
| 4,252,929 | 2/1981 | Kuroda et al. ....................... | 526/125 |

FOREIGN PATENT DOCUMENTS 2600593 7/1976 Fed. Rep. of Germany ...... 526/125

*Primary Examiner*—Edward J. Smith
*Attorney, Agent, or Firm*—Sughrue, Mion, Zinn, Macpeak, and Seas

[57] ABSTRACT

Stereospecific polymerization of α-olefins is carried out with use of a catalyst comprising an activated titanium component obtained by treating copulverized products of magnesium halide, an organosilicon compound having at least one alkoxyl group and a halogenated hydrocarbon with titanium halide, an organoaluminum compound and an electron donative compound.

5 Claims, No Drawings

PROCESS FOR POLYMERIZATION OF α-OLEFINS AND CATALYSTS THEREFOR

This is a continuation of application Ser. No. 337,553, filed Jan. 6, 1982, now abandoned, which is a continuation of application Ser. No. 116,726, filed Jan. 30, 1980, now abandoned.

BACKGROUND OF THE INVENTION

This invention relates to a process for the stereospecific polymerization of α-olefins and a catalyst therefor.

Methods of supporting the titanium compound of Ziegler-Natta catalysts on a carrier to improve the catalyst activity have been developed in a commercial scale for polymerization of α-olefins and generally, have being employed for a catalyst for polymerization of ethylene.

However, in case of polymerization of α-olefins such as propylene and butene, a useful, crystalline polymer can not be obtained unless the polymeric chain has an isotactic structure in which alkyl groups such as methyl or ethyl are stereospecifically regulated. Accordingly, catalysts improved only in polymerization activity as the case of ethylene polymerization cannot be considered to be a useful catalyst for polymerization of α-olefins and thus, regulating the stereospecificity of polymer is a significant matter.

In connection with this, there is, for example in British Pat. No. 1,435,768 provided a catalyst comprising a titanium composition, an organoaluminum compound and an electron donative compound, said titanium composition being prepared by copulverizing magnesium halide, a solid organic substance, an organic acid ester and titanium halide. Also, Japanese Patent Publication No. 52-50037 discloses a catalyst comprising a titanium composition and an organoaluminum compound, said titanium composition being obtained by reacting a copulverized product of magnesium halide and an organic acid ester with titanium tetrachloride. These catalysts are, however, still insufficient in a polymerization activity and a crystallinity of polymers obtained.

SUMMARY OF THE INVENTION

An object of this invention is to provide a process for the stereospecific polymerization of α-olefins, obtaining polymers of high stereospecificity with a high polymerization activity.

Another object of this invention is to provide a carrier type of the titanium catalyst component, obtaining a poly-α-olefin with an improved polymerization activity and stereospecificity.

According to this invention, polymerization of α-olefins is carried out in the presence of a catalyst comprising a carrier type titanium compound, an organoaluminum compound and an electron donative compound, said carrier type titanium compound being obtained by contact treatment of copulverized products of magnesium halide, an organosilicon compound having at least one alkoxyl group and a halogenated hydrocarbon with titanium halide.

DETAILED DESCRIPTION OF THE INVENTION

Magnesium halide which may be used in the preparation of the carrier type titanium compound is, preferably, a substantially anhydrous magnesium halide and particularly, magnesium chloride is preferred.

An organosilicon compound having at least one alkoxyl group which may be used in the preparation of the titanium compound may be represented by the formula,

wherein R is a hydrocarbyl group, X and Y which may be the same or different are a hydrocarbyl group, halogen atom or a carbonyloxy group represented by the formula,

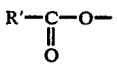

wherein R' is a hydrocarbyl group, m is 1~4, n is 0~3, p is 0~3 and m+n+p is 4. Preferred R and R' are aliphatic, alicyclic or aromatic hydrocarbons of 1~10 carbon atoms. In case X or Y are hydrocarbyl groups, aliphatic, alicyclic or aromatic hydrocarbons of 1~10 carbon atoms are preferred. Examples of these compounds include $Si(OC_2H_5)_3Cl$, $Si(OC_2H_5)_2Cl_2$, $Si(OCOCH_3)(OC_2H_5)Cl_2$, $Si(OC_2H_5)_4$, $Si(C_2H_5)_2(OC_2H_5)_2$, $Si(C_6H_5)_3$, $Si(CH_3)(C_6H_5)(OCH_3)_2$ and the like. Particularly, preferred are those having at least two alkoxyl groups, such as $Si(C_2H_5)(OC_2H_5)_3$, $Si(OC_2H_5)_4$, $Si(C_2H_5)_2(OC_2H_5)_2$ and $Si(C_6H_5)(OC_2H_5)_3$. An amount of the organosilicon compound is not particularly limited, though 0.02~0.18 moles per 1.0 mole of magnesium halide are preferred.

A halogenated hydrocarbon which may be used in the preparation of the titanium catalyst component is halogen-substituted aliphatic, alicyclic and aromatic hydrocarbons. Particularly, preferred are halogenated hydrocarbons of 1~20 carbon atoms having 1~10 halogen atoms substituted therefor, e.g. α,α,α-trichlorotoluene, α, α-dichlorotoluene, monochlorobenzene, dichlorobenzene, methylene chloride, 1,2-dichloroethane, carbon tetrachloride, perchloroethylene, ethylidene bromide and the like.

Further, preferred are halogenated hydrocarbons of liquid at an ambient temperature.

With use of the liquid halogenated hydrocarbons, catalytic activity and stereospecificity of polymers obtained are markedly improved as compared with use of halogenated hydrocarbons of solid at an ambient temperature. An amount of the halogenated hydrocarbons is not particularly limited, though 0.01~0.1 mole per 1.0 mole of magnesium halide are preferred.

In the preparation of the activated titanium component, first, the organosilicon compound having at least one alkoxyl group and the halogenated hydrocarbon are pulverized together with magnesium halide as a carrier.

In this pulverization procedure a part or all of the halogenated hydrocarbon may be displaced by an aromatic hydrocarbon of 6~20 carbon atoms. Examples of the aromatic hydrocarbons are benzene, toluene, xylene, cumene, α-methylstyrene, styrene and methoxystyrene. By way of example, copulverized products of 20 g of magnesium chloride, 2 ml of tetraethoxysilane and 4 ml of cumene or α-methylstyrene are obtained in accordance with the process of Example 1-(I) described later.

The pulverization procedure may be conducted under vacuum or atmosphere of an inert gas and should be effected in substantially the absence of oxygen and moisture. The pulverization conditions are not particularly limited, though the temperature is comprised between 0° C. and 80° C. in general. The pulverization time varies depending on type of pulverizers, but is normally comprised between 2 and 100 hours.

Next, the copulverized products thus obtained are subject to contact treatment with titanium halide. Examples of titanium halide which may be used include titanium tetrachloride, titanium tetrabromide and the like and particularly, titanium tetrachloride is preferred. The contact treatment may be conveniently effected by suspending the above copulverized products in titanium halide or in its solution in an inert solvent, maintaining the contact at temperatures of 0°~135° C. and then separating solid materials, followed by drying or removing free titanium halide by washing with an inert solvent to obtain the activated titanium catalyst component. The term of inert solvents used herein means aliphatic, alicyclic or aromatic hydrocarbons and mixtures thereof.

In accordance with this invention, the activated titanium component thus obtained is combined with an organoaluminum compound and an electron donative compound to form a catalyst of high activity for polymerization of α-olefins.

The organoaluminum compound which may be used is represented by the formula, $$AlR''_m X'_{3-m}$$

wherein R'' is a hydrocarbyl group, X' is an alkoxyl group or hydrogen or halogen atoms and m is 1.5~3.

The typical examples include triethylaluminum, tri-n-butylaluminum, tri-isobutylaluminum, tri-n-hexylaluminum, diethylaluminum monochloride, diethylaluminum hydride, diethylaluminum ethoxide and others. They may be used alone or in mixture of two or more. A mole ratio of the organoaluminum compound to titanium metal of the activated titanium component is not limited, though it is within preferably, the range of 1 to 500.

Electron donative compounds which are usually used in the α-olefin polymerization may be used in the catalysts of this invention. Preferred electron donative compounds are organic acid esters, the above-mentioned organosilicon compounds having at least one alkoxyl group and aromatic orthocarboxylic acid esters represented by the formula, $$R_1 - \underset{\underset{OR_4}{|}}{\overset{\overset{OR_2}{|}}{C}} - OR_3$$

wherein $R_1$ is an aromatic hydrocarbyl group of 6~15 carbon atoms and each of $R_2$, $R_3$ and $R_4$ which may be the same or different is a hydrocarbyl group of 1~10 carbon atoms.

Examples of the organic acid ester are methyl formate, amyl acetate, methyl acrylate, methyl methacrylate, methyl benzoate, ethyl benzoate, methyl toluylate, methyl anisate and others.

Examples of the aromatic orthocarboxylic acid ester include methyl orthobenzoate, ethyl orthobenzoate, methyl orthotoluylate, ethyl orthotoluylate, ethyl orthoanisate and the like.

The electron donative compound may be brought into contact with other components at any time during the preparation of catalyst.

Generally, there are methods of contacting the electron donative compound after contact of the activated Ti component with the organoaluminum compound, contacting the activated Ti component after contact of the organoaluminum compound with the electron donative compound, contacting the organoaluminum compound after contact of the activated Ti component with the electron donative compound or contacting the three components at the same time. It is, particularly, preferred that a part or all of the electron donative compound to be added is allowed of exist when contacting the activated titanium component with the organoaluminum compound to polymerize polymerizable monomers. An amount of the electron donative compound is within, preferably, the range of 0.1 to 0.5 moles per 1.0 mole of the organoaluminum compound. When the amount exceeds 0.5 moles, it would result in a sudden decrease in polymerization activity without a further increase in stereospecificity.

This invention may be applied to a homopolymerization or copolymerization of α-olefins having the formula, $$R''' - CH = CH_2$$

wherein R''' is an alkyl group of 1-10 carbon atoms, or a copolymerization of the above α-olefin with ethylene. Examples of the α-olefin are propylene, butene-1, hexen-1, 4-methyl-pentene-1 and the like.

The polymerization procedure according to this invention may be carried out in the conventional method using usual conditions. The polymerization temperature is generally in the range of 0°-100° C., preferably 20°-90° C. and the pressure is in the range of from normal pressure to 50 atm., preferably from normal pressure to 40 atm.

In the polymerization reaction, a solvent such as an aliphatic, alicyclic or aromatic hydrocarbon or mixture thereof may be used and may be, for example, propane, butane, pentane, hexane, heptane, cyclohexane, benzene, toluene or mixtures thereof. Also, a bulk polymerization may be employed using liquid monomers themselves as the solvent. Alternatively, the polymerization reaction may be conducted in the vapour phase wherein gaseous monomers are directly contacted with the catalyst without use of a solvent.

The molecular weight of polymers produced by the method of this invention varies depending on the manner of reaction, kind of catalyst and polymerization conditions. However, the molecular weight may be controlled by adding to the reaction system, for example, hydrogen, an alkyl halide and a dialkyl zinc, if necessary.

This invention will be illustrated by way of the following examples. Also, for the purpose of comparison there are set forth Reference Examples which are beyond the scope of this invention.

As is apparent from the Examples, in accordance with this invention there are provided poly-α-olefins having a Total I I about 2% higher than and a yield per a unit amount of catalyst about 30~60% higher than polymers by conventional catalysts. Also, in case of using an aromatic hydrocarbon such as cumene and α-methylstyrene instead of the halogenated hydrocarbon, there are provided poly-α-olefins having a Total I I about 1.0% higher than and a yield per an unit amount of catalyst about 10~25% higher than polymers by conventional catalysts.

EXAMPLE 1

(I) 20.0 g of magnesium chloride, 4 ml of tetraethoxysilane, and 2 ml of α,α,α-trichlorotoluene were added under nitrogen atmosphere to a vibration mill provided with a pot of 600 ml in inner volume, in which 80 steel balls with a diameter of 12 mm had been placed and then, pulverized for 40 hours. 10 g of the pulverized products thus obtained and 50 ml of TiCl$_4$ were charged into a 200 ml round-bottomed flask and stirred at 80° C. for two hours and thereafter, the supernantant liquid was removed by decantation. Next, after repeating seven times a washing treatment consisting of the steps of stirring with 100 ml of n-heptane at 80° C. for 15 minutes and removing the supernatant liquid by decantation, further 100 ml of n-heptane were added to obtain an activated Ti component slurry. A part of the activated Ti component slurry was sampled and subjected to analysis after evaporating n-heptane. As a result a Ti content of the activated Ti component was 2.00% by weight. (II) 1.0 l of n-heptane, 70 mg of the above activated Ti component, 0.375 ml of triisobutylaluminum, 0.24 ml of diethylaluminum chloride and 0.14 ml of ethyl benzoate were charged into a 3.0 l stainless steel autoclave under nitrogen atmosphere. After exhausting the nitrogen gas from the autoclave by means of a vacuum pump, gaseous hydrogen was fed till the partial pressure of 0.1 Kg/cm$^2$ Gauge. The autoclave was heated and after 5 minutes, the inner temperature was elevated to 70° C.

While feeding propylene to maintain the pressure at 5 Kg/cm$^2$ Gauge, polymerization was continued at 70° C. for one hour.

After cooling the autoclave, unreacted propylene was purged and the contents were removed, filtered and dried at 60° C. under reduced pressure. Thus 258 g of a white powdery polypropylene were obtained.

Extraction residue of polymer with boiling n-heptane (hereinafter referred to as "Powder I I") was 98.6%, bulk density 0.29 g/ml and limiting viscosity number (135° C., tetralin) 1.58.

On the other hand, 4.8 g of polymers soluble in n-heptane were obtained by concentration of the filtrate. A ratio of the extraction residue of polymer with boiling n-heptane to the total polymer (hereinafter referred to as "Total I I") was 96.8%.

A polymerization activity of the catalyst in this polymerization reaction was 187.7 Kg/g.Ti.hr (Formation rate of polymer per gram of activated Ti per hour).

REFERENCE EXAMPLE 1

An activated Ti component was obtained in the same manner as in Example 1-(I) except omitting the use of α,α,α-trichlorotoluene during the pulverization. The Ti content of the activated Ti component was 3.37% by weight.

Propylene was polymerized in the same manner as in Example 1-(II) except using 92 mg of the above activated Ti component. The results are set forth in Table 1.

REFERENCE EXAMPLE 2

An activated Ti component was prepared in the same procedure as in Example 1-(I) except omitting the use of tetraethoxysiliane during the pulverization. The Ti content of the activated Ti component was 1.37% by weight. Propylene was polymerized in the same manner as in Example 1-(II) except using 102 mg of the above Ti component. The results are set forth in Table 1.

REFERENCE EXAMPLE 3

An activated Ti component was prepared in the same manner as in Example 1-(I) except using 5 ml of ethyl benzoate instead of α,α,α-trichlorotoluene during the pulverization. The Ti content of the activated Ti component was 2.42% by weight. Propylene was polymerized in the same procedure as in Example 1-(II) except using 68 mg of the above Ti component. The results are set forth in Table 1.

TABLE 1

| Reference Example No. | Activated Ti Component | | Yield of Powders g | Activity | | Total I I % | Limiting Viscosity Number | Bulk Density g/ml |
|---|---|---|---|---|---|---|---|---|
| | | | | g/g · Ti-Cat · hr | Kg/g · Ti · hr | | | |
| 1 | Tetraethoxysilane, 4 ml | — | 134 | 1457 | 43 | 93.1 | 1.31 | 0.30 |
| 2 | — | α,α,α-Trichlorotoluene, 2 ml | 76 | 745 | 54 | 83.9 | 1.33 | 0.27 |
| 3 | Tetraethoxysilane, 4 ml | Ethyl Benzoate 5 ml | 145 | 2132 | 88 | 93.9 | 1.69 | 0.30 |

EXAMPLES 2-4

An activated Ti component was prepared in the same manner as in Example 1-(I) except using ethyltriethoxysilane, phenyltriethoxysilane and diethoxydimethylsilane, respectively instead of tetraethoxysilane. Using the activated Ti component thus obtained, polymerization of propylene was carried out in the same procedure as in Example 1-(II). The results are set forth in Table 2.

EXAMPLES 5-11

An activated Ti component was prepared in the same manner as in Example 1-(I) except using carbon tetrachloride, carbon tetrabromide, chlorobenzene, perchloroethylene, 1,1,1-trichloroethane, 1,2-dichloroethane and 1,1-dichloroethane, respectively instead of α,α,α-trichlorotoluene in the pulverization step. Using the activated Ti component thus obtained, polymerization of propylene was carried out in the same manner as in Example 1-(II). The results are set forth in Table 2.

EXAMPLES 12-14

In these Examples the activated Ti component prepared in Example 1-(I) was used. Using triethoxyphenylsilane, tetraethoxysilane and methyl orthobenzoate, respectively as the electron donative compound in the polymerization, the procedure of Example 1-(II) was conducted at 70° C. under a polymerization pressure of 5 Kg/cm$^2$ Gauge. The results are set forth in Table 3.

TABLE 2

| Example No. | Activated Ti Component | | Ti Content % | Yield of Powders g | Activity g/g · Ti Cat · hr | Activity Kg/g · Ti · hr | Total I I % | Limiting Viscosity Number | Bulk Density g/ml |
|---|---|---|---|---|---|---|---|---|---|
| 2 | Ethyltriethoxy-silane, 4 ml | α,α,α-Trichloro-toluene, 2 ml | 1.62 | 165 | 2357 | 145 | 94.8 | 1.38 | 0.37 |
| 3 | Phenyltriethoxysilane, 4 ml | α,α,α-Trichloro-toluene, 2 ml | 1.86 | 205 | 2929 | 157 | 94.9 | 1.42 | 0.35 |
| 4 | Diethoxydimethylsilane, 4 ml | α,α,α-Trichloro-toluene, 2 ml | 1.52 | 192 | 2743 | 180 | 95.2 | 1.40 | 0.36 |
| 5 | Tetraethoxy-silane, 4 ml | Carbon tetra-chloride, 2 ml | 3.14 | 245 | 3500 | 111 | 94.5 | 1.39 | 0.29 |
| 6 | Tetraethoxy-silane, 4 ml | Carbon tetra-bromide, 3 g | 2.34 | 180 | 2365 | 101 | 93.9 | 1.41 | 0.29 |
| 7 | Tetraethoxy-silane, 4 ml | Monochloro-benzene, 1 ml | 2.99 | 159 | 2270 | 76 | 96.6 | 1.48 | 0.34 |
| 8 | Tetraethoxy-silane, 4 ml | Perchloro-ethylene, 1 ml | 3.82 | 262 | 3742 | 98 | 93.8 | 1.89 | 0.38 |
| 9 | Tetraethoxy-silane, 4 ml | 1,1,1-Trichloro-ethane, 2 ml | 2.01 | 210 | 2830 | 141 | 94.9 | 1.42 | 0.34 |
| 10 | Tetraethoxy-silane, 4 ml | 1,2-Dichloro-ethane, 2 ml | 3.05 | 218 | 2910 | 95 | 95.4 | 1.38 | 0.32 |
| 11 | Tetraethoxy-silane, 4 ml | 1,1-Dichloro-ethane, 2 ml | 2.42 | 201 | 2653 | 109 | 94.6 | 1.29 | 0.30 |

TABLE 3

| Example No. | Activated Ti Component | Org. Al Compound $(C_2H_5)_2AlCl$ | Org. Al Compound $(C_2H_5)_3Al$ | Electron Donative Compound | Yield of Powders g | Activity g/g · Ti Cat · hr | Activity Kg/g · Ti · hr | Total I I % | Limiting Viscosity Number | Bulk Density g/ml |
|---|---|---|---|---|---|---|---|---|---|---|
| 12 | 120 mg | 0.07 ml | 0.12 ml | Triethoxy-phenylsilane 0.09 ml | 261 | 2219 | 111 | 94.5 | 1.48 | 0.34 |
| 13 | 133 | 0.07 | 0.12 | Tetraethoxy-silane 0.09 | 188 | 1508 | 75 | 93.1 | 1.23 | 0.33 |
| 14 | 159 | 0.20 | 0.20 | Methyl Ortho-benzoate 0.08 | 249 | 1598 | 80 | 92.1 | 1.59 | 0.36 |

EXAMPLES 15-16

An activated Ti component was prepared in the same manner as in Example 1-(I) except using 3 g of hexachlorobenzene and 3 g of polyvinyl chloride (Number average molecular weight, about 70,000), respectively instead of α,α,α-trichlorotoluene in the pulverization step.

Using the activated Ti component thus obtained, polymerization of propylene was carried out in the same manner as in Example 1-(II). The results are set forth in Table 4.

TABLE 4

| Example No. | Activated Ti Component | | Yield of Powders g | Activity g/g · Ti-Cat · hr | Activity Kg/g · Ti · hr | Total I I % | Limiting Viscosity Number | Bulk Density g/ml |
|---|---|---|---|---|---|---|---|---|
| 15 | Tetraethoxy-silane, 4 ml | Hexachloro-benzene 3 g | 129 | 1230 | 35 | 92.8 | 1.91 | 0.26 |
| 16 | Tetraethoxy-silane, 4 ml | Polyvinyl chloride 3 g | 105 | 1050 | 21 | 90.0 | 1.61 | 0.24 |

What is claimed is:

1. A process for the stereospecific polymerization of α-olefins with use of a catalyst comprising a titanium compound supported on a carrier, an organoaluminum compound and an electron donative compound, wherein as the titanium compound supported by a carrier, an activated titanium compound obtained by
    (a) copulverizing a magnesium halide, an organosilicon compound selected from the group consisting of tetraethoxysilane, phenyltriethoxysilane, diethoxydiethylsilane, diethoxydimethylsilane and ethyltriethoxysilane and a halogenated hydrocarbon of 1~20 carbon atoms which has 1~10 halogen atoms substituted thereon and which is liquid at ambient temperature, to obtain a copulverized product and then contacting said copulverized product with
    (b) titanium tetrachloride, said contacting being conducted without further pulverizing,
is used
    wherein the ratio of said organosilicon compound to said magnesium halide is in the range of about 0.02 to 0.18 mols per mol and wherein the ratio of said halogenated hydrocarbon to said magnesium halide is in the range of about 0.01 to 0.1 mols per mol.

2. The process of claim 1, wherein said magnesium halide is magnesium chloride.

3. A catalyst for the stereospecific polymerization of α-olefins comprising a titanium compound supported on a carrier, an organoaluminum compound and an electron donative compound, wherein, as the titanium compound supported on a carrier an activated titanium compound obtained by (a) copulverizing a magnesium halide, an organosilicon compound selected from the group consisting of tetraethoxysilane, phenyltriethoxysilane, diethoxydiethylsilane, diethoxydimethylsilane and ethyltriethoxysilane and a halogenated hydrocarbon of 1~20 carbon atoms which has 1~10 halogen atoms substituted thereon and which is liquid at ambient temperature, to obtain a copulverized product and then contacting said copulverized product with (b) titanium tetrachloride, said contacting being conducted without further pulverizing, in used wherein the ratio of said organosilicon compound to said magnesium halide is in the range of about 0.02 to 0.18 mols per mol and wherein the ratio of said halogenated hydrocarbon to said magnesium halide is in the range of about 0.01 to 0.1 mols per mol of said magnesium halide.

4. The catalyst of claim 3 wherein said halogenated hydrocarbon is a halogen-substituted aliphatic, alicyclic or aromatic hydrocarbon.

5. The catalyst of claim 3 wherein said magnesium halide is magnesium chloride.

* * * * *